Oct. 5, 1971  J. E. MORSE ETAL  3,610,120
PHOTOGRAPHIC APPARATUS AND METHOD FOR PRODUCING A
TAMPERPROOF IDENTIFICATION CARD WITH A
HOMOGENEOUS BACKGROUND

Filed March 4, 1970  2 Sheets-Sheet 1

JOHN E. MORSE
CLAIRE L. JAMES
INVENTORS

BY *John D. Hussey*
*Robert W. Hampton*
ATTORNEYS

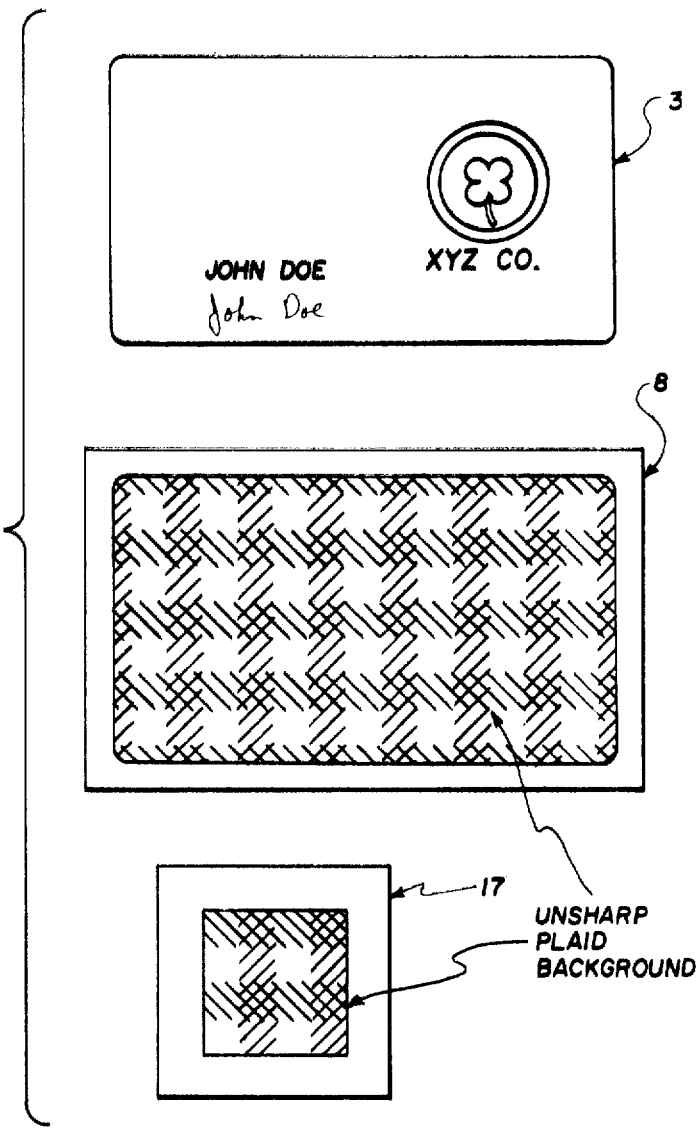

United States Patent Office 3,610,120
Patented Oct. 5, 1971

3,610,120
PHOTOGRAPHIC APPARATUS AND METHOD FOR PRODUCING A TAMPERPROOF IDENTIFICATION CARD WITH A HOMOGENEOUS BACKGROUND
John E. Morse, Rochester, and Claire L. James, Pittsford, N.Y., assignors to Eastman Kodak Company, Rochester, N.Y.
Filed Mar. 4, 1970, Ser. No. 16,326
Int. Cl. G03b 17/24
U.S. Cl. 95—1.1                11 Claims

ABSTRACT OF THE DISCLOSURE

An optical apparatus and method for producing and recording a composite image including images at different magnifications of two or more objects. The composite image formed by the apparatus also includes a homogeneous background composed of separate backgrounds imaged with each object, the background images being produced in a manner such that there are no clearly discernible edges therebetween. The apparatus includes optical systems for producing individual images of separate objects and respective background images, and an optical system for combining such images into a composite image which can be recorded on a record medium. A portion of the light from one object is blocked, preferably by a part of the optical system combining the images, and light from the other object is optically substituted for the blocked portion thereby producing a composite image of adjacent individual images in which the respective background images are substantially in registry. The apparatus is especially suited for making tamperproof identification cards.

CROSS-REFERENCES TO RELATED APPLICATIONS

Reference is made to commonly assigned copending U.S. patent application Ser. No. 16,434, entitled Photographic Apparatus and Method for Producing a Tamperproof Identification Card, filed in the name of John E. Morse on Mar. 4, 1970; and commonly assigned copending U.S. patent application Ser. No. 16,393, entitled Improved Photographic Apparatus for Producing a Tamperproof Identification Card, filed in the name of John E. Morse on Mar. 4, 1970.

BACKGROUND OF THE INVENTION

The present invention relates to apparatus and methods for combining individual images of at least two objects into a composite image on a record medium. More particularly, it relates to apparatus and methods for producing a record of such a composite image having a homogeneous background composed of separate backgrounds recorded with each object, the juncture of the separate backgrounds being unsharp and substantially nondiscernible.

In commonly assigned copending U.S. application Ser. No. 16,434, entitled Photographic Apparatus and Method for Producing a Tamperproof Identification Card, and commonly assigned copending U.S. application Ser. No. 16,393, entitled Improved Photographic Apparatus for Producing a Tamperproof Identification Card, both applications filed in the name of John E. Morse on Mar. 4, 1970, apparatus are disclosed for producing a record of a composite image of two or more individual images at different magnifications without any clearly discernible border edges between such individual images. As was discussed in the first referenced copending application, prior art apparatus have not effectively produced a composite photograph without sharp edges separating the individual images contained in the photograph. In the present application, an apparatus different from those of the referenced copending applications is described for producing a record of a composite image which is inherently tamperproof, that is, one in which one of the individual recorded images cannot be separated from the other individual recorded image and a different image substituted therefor without such substitution being detectable by the average layman.

SUMMARY OF THE INVENTION

Accordingly, it is an object of this invention to produce a composite image and a record thereof containing individual images of at least two objects at different magnifications wherein the backgrounds of the individual images are joined into a homogeneous background throughout the entire composite image.

It is another object of this invention to provide apparatus for photographing as a composite image at least two objects at different magnifications and to provide in such composite image a homogeneous background composed of individual backgrounds without a readily discernible juncture.

It is still another object of this invention to provide an apparatus for use with a camera to facilitate photographing at least two objects at different magnifications with individual background images, such background images provided by said apparatus, to produce a composite image of the object images on a photographic medium, such composite image having a homogeneous background composed of the individual background images.

It is a further object of this invention to provide a method of producing on a photographic medium a composite image having a continuous uninterrupted background.

Still another object of this invention is to provide a method for producing an improved photographic identification card.

In a preferred embodiment of the invention, an optical apparatus is provided wherein the image of one object is superimposed on a distinctive background image provided by the apparatus, and a second background image substantially identical in pattern to the first background image is provided for a second object. An image of the second object with provided second background image is formed and then optically combined with the image of the first object with the first background image into a composite image in a manner such that the separate background images are joined together substantially in registry to produce a homogeneous background in the composite image without any discernible juncture of the separate background images. A means is also provided for recording the composite image.

The term "field" as used in the specification and claims of this application with reference to lens systems refers to the area within the light transmission path of a lens on either side of the lens, i.e., the object side or the image side, unless "field of view" is specified, in which case reference is to the object side of the lens only.

The term "magnification," as used in the specification and claims of this application with reference to image formation, is used in its technical sense which includes values less than one (sometimes referred to as minification or reduction) as would be produced by negative (or divergent) lenses, in which case the image is smaller than the object, as well as values greater than one, produced by positive (or convergent) lenses, where the image is larger than the object.

Other objects and advantages of the invention will become apparent from the detailed description of the preferred embodiment presented below.

BRIEF DESCRIPTION OF THE DRAWING

In the detailed description of the preferred embodiment of the invention presented below, reference is made to the accompanying drawings, in which:

FIG. 2B illustrates various elements used to produce the identification card depicted in FIG. 2A.

DESCRIPTION OF THE PREFERRED EMBODIMENT

Figure 1:
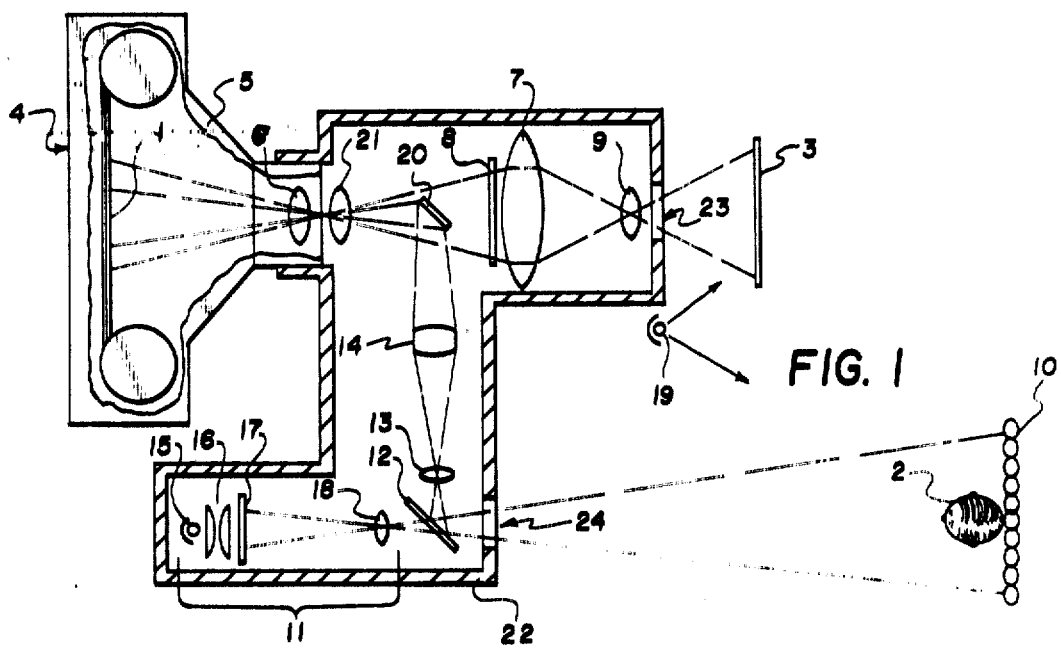
FIG. 1 is a schematic illustration of one embodiment of the invention.
Figure 2A:
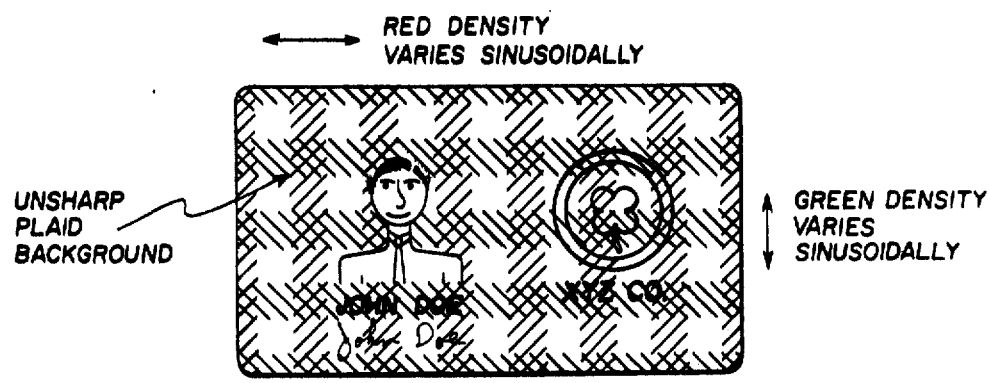
FIG. 2A illustrates the format of an identification card which can be produced with the invention.

Referring to FIG. 1 of the drawings, there is shown an apparatus for providing distinctive background images for two objects, and for producing, at different magnifications, images of the two objects in superimposition with a respective background image. Means are also provided for combining the two images with their respective backgrounds as a composite image which can be recorded on a record medium 1 located in the primary image plane of the apparatus. In this instance, one object is a person, indicated by the reference numeral 2, and the second object is a card or sheet 3 (also depicted in FIG. 2B) bearing certain data or factual information regarding such person. The composite image formed and recorded on medium 1 can be used to produce an identification card of the type and format illustrated in FIG. 2A of the drawings.

As shown in FIG. 1, a record medium 1, in this instance a photographic film, is suitably supported in the primary image plane of a camera 4. The camera 4 can take the form of a still camera having a housing 5 and an objective 6 for forming an image on film 1.

As is well known to those skilled in the art, a lens system such as a camera objective 6 has a predetermined field of view. In the illustrated embodiment means are provided for producing a combined image of the data card 3 and the person 2, with respective distinctive backgrounds, in the field of objective 6 so that the combined image can be recorded by camera 4.

In the embodiment shown in FIG. 1, means for producing an image of data card 3 superimposed with a distinctive background image is shown positioned within the field of, and optically aligned with, camera objective 6, and includes a field lens 7, a transparency 8 located adjacent field lens 7 and bearing the image of a particular background pattern, and an objective 9. In operation, the image of data card 3 is formed by objective 9 near field lens 7 and transparency 8. The superimposed data card image and background image are then combined with the image of person 2 with a background image as hereinafter described.

Means shown in FIG. 1 for producing an image of person 2 with a distinctive background includes a screen 10 positioned behind person 2, projecting means 11 for projecting the distinctive background image on screen 10, a beam splitter such as, for example, a semi-reflecting mirror 12, an objective 13, and a field lens 14. Projecting means 11 of one type known in the art is located in front of person 2 and includes a projection lamp 15, a condenser 16, a transparency 17 bearing the image of the distinctive background pattern, and a projection lens 18. Objective 13 is substantially optically coincident with projection lens 18 via semi-reflective mirror 12. Screen 10 is a retro-reflective screen, that is, one which substantially reflects incident light only along that path which is coincident with the path of the incident light.

In operation, the distinctive background image is projected through semi-reflecting mirror 12 to person 2 and screen 10. Since light reflected by screen 10 is substantially coincident with light incident upon the screen, semi-reflecting mirror 12 is positioned within the light path of projection means 11 in order to intercept the reflected background light. The background light which is projected upon person 2 is scattered, inasmuch as the person 2 is diffuse. Therefore, the portion of the distinctive background light which is reflected back towards mirror 12 by the person 2 is of negligible intensity and is rendered substantially nondiscernible in the overall scene of objective 13 by employing a separate illumination source 19 placed at an oblique angle to screen 10. A substantial portion of light from source 19 which is incident upon screen 10 is reflected back toward source 19, that portion reflected by screen 10 toward the semi-reflecting mirror 12 being of negligible intensity. However, illumination source 19 is of sufficient intensity so that light from source 19 reflected by person 2 to mirror 12 will effectively swamp any projected background light reflected by person 2 to mirror 12.

With the arrangement described above, an image of person 2 surrounded by an image of the distinctive background projected by projecting means 11 is formed by objective 13 near field lens 14.

In the embodiment of the present invention shown in FIG. 1, means for combining the distinctively backgrounded images of person 2 and data card 3 includes a lens 21 and a mirror 20. Lens 21 is located within the field of, and optically aligned with, camera objective 6 and between objective 6 and the plane in which the image of data card 3 is formed by objective 9. Mirror 20 is located in the field of and aligned with lens 21 and positioned so as to direct light from field lens 14 to lens 21 and so as to mask a portion of the light from field lens 7. Consequently, the image of person 2 produced near field lens 14 by objective 13 appears in the field of lens 21, in effect having been optically substituted for that portion of the light from field lens 7 which is blocked by mirror 20. Therefore, the image of person 2 with background and the superimposed image of data card 3 and its background together become the object for lens 21 which reimages them as a composite image. This composite image becomes the object for camera objective 6, which forms an image thereof on film 1.

The distinctive background images which are combined with the individual object images are substantially identical in pattern, and the backgrounds are advantageously registered to produce the appearance of an uninterrupted homogeneous background for the composite image. Since the composite image background is intended to present a complicated matching problem to anyone attempting to substitute a new image for one of the original images, the common background pattern has suitable visual characteristics such as, for example, a red color that continuously varies sinusoidally in density in one direction and green color that continuously varies sinusoidally in density in an orthogonal direction. The background pattern of the type described produces an unsharp plaid pattern which is illustrated as diagonal lines in a horizontal and vertical orientation in FIGS. 2A and 2B. Of course, it will be understood that the pattern utilized with the invention for the composite background need not be limited to that described above, but can be any pattern effective for producing a complicated matching problem.

Since precise alignment of the separate background images may be time consuming in certain applications of the present invention, a blurred transition zone can be produced between the separate background images. Such a zone has no clearly discernible edges but rather blends the separate background images into what appears to be a continuous uninterrupted background. The formation of the blurred transition zone is accomplished by spacing mirror 20 from lens 21 at a proper distance to blur the edge of the superimposed data card/background image defined by the edge of mirror 20. Therefore there is no mirror edge definition in the composite image formed by lens 21 but rather the above-mentioned transition zone is produced which effectively obscures any misalignment that exists between the separate background images.

After exposure to the composite image formed by lens 21 in the manner described above, film 1 can be processed by conventional photographic methods. By printing the film negative (not shown) on a conventional photosensitive medium a tamperproof identification card which has a continuously uninterrupted and substantially homogeneous background and of the type shown in FIG. 2A can be produced. No sharp edges will appear between the object images thereby making it difficult to separate the images without the separation being visually detectable.

The means described above for producing an image of each object superimposed with their respective background images, and the means for combining such images, can be supported in various ways. In accordance with one feature of the embodiment shown in FIG. 1, they can be supported in a housing 22 with object viewing apertures 23 and 24, such housing being detachably connected with camera housing 5. If desired, camera 4 can be made an integral part of housing 22 without departing from the scope of this invention. Likewise, illumination source 19 can be used to illuminate data card 3 as well as person 2, or a separate light source can be provided. Furthermore, the background for person 2 can be projected on a rear-projection screen, located behind person 2, by a projector located rearwardly of person 2 and the screen, rather than in the manner hereinbefore disclosed, while remaining within the scope of the invention.

The invention has been described in detail with particular reference to a preferred embodiment thereof, but it will be understood that variations and modifications can be effected within the spirit and scope of the invention.

We claim:

1. Photographic apparatus for producing on a photographic medium a composite image having a continuous uninterrupted background, said apparatus comprising:
   (a) means for containing the photographic medium;
   (b) a first objective mounted on said containing means at a location for forming an image on the photographic medium;
   (c) first means for producing a first background image having a pattern;
   (d) first means for producing, in superimposition with the first background image, an image of a first object at a first magnification;
   (e) second means for producing a second background image having a pattern substantially identical to the pattern of the first background image;
   (f) second means for producing, in superimposition with the second background image, an image of a second object at a second magnification; and
   (g) combining means for producing a composite image of:
      (1) the first object image in superimposition with the first background image, and
      (2) the second object image in superimposition with the second background image,
   said combining means being positioned in the field of said first objective so that the composite image produced by said combining means is the object for said first objective, said first and second background image producing means being positioned so that the first and second background pattern images are in registry in the composite image.

2. Photographic apparatus as defined in claim 1 wherein said first means for producing a first object image comprises:
   (a) a first field lens positioned in the field of said first objective; and
   (b) a second objective optically aligned with said first field lens and positioned for forming an image near said first background image producing means.

3. Photographic apparatus as defined in claim 2 wherein said first background image producing means comprises a transparency bearing an image of the first background and supported near said first field lens in optical alignment therewith.

4. Photographic apparatus as defined in claim 1 wherein said second means for producing a second object image comprises:
   (a) a second field lens positioned so as to transmit light to said combining means;
   (b) a third objective optically aligned with said second field lens and positioned so as to form an image near said second field lens; and
   (c) reflecting means for directing light from the second object and the second background image to said third objective.

5. Photographic apparatus as defined in claim 4 wherein:
   (a) said second background image producing means comprises:
      (1) means for projecting light through a transparency image of the second background toward the second object, and
      (2) a retro-reflective screen located on the opposite side of the second object from said projecting means so as to receive light projected by said projecting means thereby defining an image of the second background on a portion of said screen; and
   (b) said reflecting means comprises a beam splitter located between said projecting means and the second object such that it can direct light reflected from the second object and said screen to said third objective without substantially interfering with the light projected by said projecting means toward the second object and said screen.

6. Photographic apparatus as defined in claim 1 wherein said combining means comprises:
   (a) a reimaging lens optically aligned with and positioned between said first field lens and said first objective so as to form the composite image;
   (b) a mirror positioned between said first field lens and said reimaging lens and oriented so that it reflects light from said second field lens to said reimaging lens while blocking a portion of the light transmitted from said first field lens to define at least one edge of the superimposed image of the first object and first background.

7. Photographic apparatus as defined in claim 6 wherein said mirror is spaced from said reimaging lens a distance sufficient to blur said one edge of the superimposed first object/first background.

8. Photographic apparatus as defined in claim 1 wherein the identical patterns of the first and second background images comprise a particular visual characteristic including a first predetermined color, the density of which varies sinusoidally in a first direction, and a second predetermined color, the density of which varies sinusoidally in a second direction.

9. Apparatus for attachment to a camera to facilitate photographing a composite image, with a continuous uninterrupted background, of at least two objects at different magnifications, the apparatus being for use with a camera of the type having a primary image plane and an objective for forming an image in the primary image plane at a first magnification, said apparatus comprising:
   (a) a support;
   (b) means for detachably connecting said support to the camera in operative relation with the camera objective;
   (c) first means, located on said support so as to be in the field of the camera objective when said support is connected to the camera, for producing a first background image having a pattern;
   (d) first means, located on said support, for producing, in superimposition with the first background image, an image of a first object at a first magnification when the first object is in the field of the camera objective;
(e) second means for producing a second background image having a pattern substantially identical to the pattern of the first background image;
(f) second means, located on said support, for producing, in superimposition with the second background image, an image of a second object at a second magnification;
(g) combining means for producing a composite image of:
   (1) the first object image in superimposition with the first background image, and
   (2) the second object image in superimposition with the second background image,
said combining means being located on said support and positioned so as to be in the field of the camera objective when said support is connected to the camera so that the composite image produced by said combining means is the object for the camera objective, said first and second background image producing means being positioned so that the first and second background pattern images are in registry in the composite image.

10. A method for producing on a photographic medium a composite image having a continuous uninterrupted background, said method comprising:
(a) superimposing a first image of a first object at a first magnification with a first background image having a pattern;
(b) superimposing a second image of a second object at a second magnification with a second background image having a pattern substantially identical to the pattern of the first background image;
(c) combining the superimposed images and their respective backgrounds into a composite image in a manner such that the transition between the first and second background images is substantially nondiscernible; and
(d) forming the composite image on a photographic medium.

11. A method for producing a photographic identification card containing a composite image having a continuous uninterrupted background, said method comprising:
(a) superimposing a first image of a first object at a first magnification with a first background image having a pattern;
(b) superimposing a second image of a second object at a second magnification with a second background image having a pattern substantially identical to the pattern of the first background image;
(c) combining the superimposed images and their respective backgrounds into a composite image in which the first and second background images are adjacent and in registry;
(d) forming the composite image on photographic film to produce a latent composite image;
(e) converting the latent composite image into a negative composite image by processing the photographic film; and
(f) producing a print of the negative composite image on a card.

References Cited

UNITED STATES PATENTS

| | | | |
|---|---|---|---|
| 3,111,887 | 11/1963 | Alexander | 95—1.1 |
| 3,215,030 | 11/1965 | Jordan | 355—45 X |
| 3,439,982 | 4/1969 | Ludwig | 353—34 |
| 3,480,362 | 11/1969 | Dejoux | 355—44 X |

SAMUEL S. MATTHEWS, Primary Examiner

E. M. BERO, Assistant Examiner

U.S. Cl. X.R.

352—47, 49, 89; 353—28, 29; 355—45